(12) United States Patent
Meritt-Powell

(10) Patent No.: US 7,273,546 B2
(45) Date of Patent: Sep. 25, 2007

(54) DISPOSABLE FILTER BAG FOR A POOL CLEANER

(75) Inventor: Michael A. Meritt-Powell, Oceanside, CA (US)

(73) Assignee: Zodiac Pool Care, Inc., Vista, CA (US)

( * ) Notice: Subject to any disclaimer, the term of this patent is extended or adjusted under 35 U.S.C. 154(b) by 348 days.

(21) Appl. No.: 11/103,714

(22) Filed: Apr. 11, 2005

(65) Prior Publication Data

US 2005/0236310 A1    Oct. 27, 2005

Related U.S. Application Data

(60) Provisional application No. 60/564,740, filed on Apr. 22, 2004.

(51) Int. Cl.
    *B01D 29/27*    (2006.01)
(52) U.S. Cl. .............. 210/167.17; 210/416.2; 210/448
(58) Field of Classification Search .......... 210/167.01, 210/167.1, 167.16, 167.17, 416.1, 448, 416.2; 15/1.7

See application file for complete search history.

(56) References Cited

U.S. PATENT DOCUMENTS

| | | |
|---|---|---|
| 3,822,754 A | 7/1974 | Henkin et al. |
| 4,558,479 A | 12/1985 | Greskovics et al. |
| 4,575,423 A | 3/1986 | Alanis et al. |
| 4,589,986 A | 5/1986 | Greskovics et al. |
| 4,618,420 A | 10/1986 | Alanis |
| D288,373 S | 2/1987 | Alanis |
| D294,963 S | 3/1988 | Alanis et al. |
| 5,863,425 A | 1/1999 | Herlehy et al. |
| D409,341 S | 5/1999 | Van Etten et al. |
| 6,241,899 B1 | 6/2001 | Ramos |
| D468,067 S | 12/2002 | Stoltz et al. |
| 6,665,900 B2 | 12/2003 | Wichmann et al. |
| 6,740,233 B2 | 5/2004 | Stoltz et al. |
| 2005/0279682 A1* | 12/2005 | Davidson et al. ........... 210/169 |

FOREIGN PATENT DOCUMENTS

FR    2719785    * 11/1995

\* cited by examiner

*Primary Examiner*—Fred G. Prince
(74) *Attorney, Agent, or Firm*—Kilpatrick Stockton LLP

(57) ABSTRACT

An improved disposable filter bag for use with a pool cleaner of the type disclosed, for example, in U.S. Pat. Nos. 5,863,425; 4,558,479; and 3,822,754. The filter bag is formed from a porous filter material having marginal seams formed by direct welding to form a reinforced cuff defining an open bag mouth leading to a hollow bag interior. The cuff is configured for removable mounting on a pool cleaner suction mast, as by removable connection to a mounting collar as disclosed in U.S. Pat. Nos. 5,863,425; D409,341; and D468,067. A divider seam defined by a spaced-apart array of welds subdivides the bag interior into a primary flow chamber for receiving flow of water and water-entrained debris from the pool cleaner, and a secondary collection chamber for trapping and collecting the water-entrained debris.

20 Claims, 3 Drawing Sheets

DISPOSABLE FILTER BAG FOR A POOL CLEANER

This application claims benefit of. U.S. Provisional Application No. 60/564,740, filed Apr. 22, 2004.

BACKGROUND OF THE INVENTION

This invention relates generally to improvements in automatic pool cleaners and related accessories therefor, wherein the pool cleaner is designed for travel within a swimming pool or the like to dislodge and collect debris. More specifically, this invention relates to an improved filter bag for removable mounting onto the pool cleaner for collecting debris, wherein the filter bag is designed for convenient and economical disposal following a single use cycle, as shown and described in copending U.S. Ser. No. 10/917,790. The improved filter bag further defines a bag interior subdivided by a divider seam into a primary flow chamber for receiving flow of water and water-entrained debris from the pool cleaner, and a secondary collection chamber for trapping and collecting the water-entrained debris, wherein this divider seam is defined by a spaced-apart array of welds to form a divider seam of increased strength and resultant increased tear resistance.

Automatic swimming pool cleaners are well known in the art for use in maintaining a swimming pool in an overall state of cleanliness. In this regard, residential and commercial swimming pools normally include a standard waterfiltration system including a main circulation pump and related main filter unit for filtering the pool water. The filtration system is typically operated for several hours on a daily basis to draw water from the pool for flow through the main filter unit and subsequent return circulation to the pool, wherein the filter unit includes an appropriate filter media for collecting and thus removing solid debris such as fine grit and silt, twigs, leaves, insects, and other particulate matter suspended within the pool water. Although such filtration systems function efficiently to collect suspended particulate, it has been recognized that some particulate tends to settle onto submerged pool floor and wall surfaces and thus is not removed by the standard filtration system. Automatic swimming pool cleaners have been developed and are widely used to assist in a more thorough cleaning of the pool by directly collecting such settled matter, and/or by re-suspending the settled matter so that it can be collected by the main filter unit.

More specifically, in one common form, the automatic swimming pool cleaner comprises a relatively compact wheeled housing adapted to travel randomly over submerged floor and wall surfaces of the pool. The cleaner is normally connected by a water supply hose or the like to the standard filtration system, such as by connection to the positive pressure discharge side of the system as described in U.S. Pat. Nos. 6,665,900; 5,863,425; 4,558,479; 4,589,986; and 3,822,754. The filtration system provides a water flow through the supply hose to the cleaner, wherein this water flow is typically used to create or induce an upwardly directed suction flow through a suction mast for vacuuming grit and debris through the suction mast into a porous filter bag mounted on an upper or downstream end thereof. The water flow through the pool cleaner may also be used to power a hydraulic drive means which causes the cleaner to travel about within the swimming pool.

In general terms, the filter bag is constructed from one or more sheets of the porous filter bag material with marginal edges attached or interconnected by seams to form a hollow bag interior with an open bag mouth adapted for removable connection onto the upper end of the pool cleaner suction mast. In the case of a traditional woven fabric bag material, these marginal seams have been formed typically by sewing. Such fabric-based filter bags beneficially accommodate relatively long-term usage, with periodic removal of the filter bag from the pool cleaner suction mast so that collected debris accumulated therein can be discarded followed by re-mounting of the filter bag onto the pool cleaner for a subsequent cycle of use. However, such re-usable filter bags can become worn and/or frayed over time and thus become unsightly, especially in combination with accumulation of residual debris that may including aged organic matter. Exemplary filter bags of this general type and related techniques for removable mounting onto the pool cleaner suction mast are shown and described in U.S. Pat. Nos. 4,618,420; D288,373; 4,575,423; D294,963; 4,589,986; 5,863,425; D409,341; D468,067; and 6,740,233.

More recently, single-use or disposable filter bags formed from a non-fabric or non-woven porous material has been proposed, wherein the bag material is shaped by marginal seams using a thermoplastic or heat-melt adhesive. See, for example, U.S. Pat. No. 6,241,899. Such disposable filter bags are intended for removal from the pool cleaner suction mast when the bag becomes substantially filled with debris, followed by mounting of a replacement disposable filter bag onto the pool cleaner for a subsequent use cycle. Such disposable filter bags, however, have exhibited inconsistent performance with occasional premature bag failure caused by rupture of the seam-forming adhesive material. It is believed that such bag failures have been attributable at least in part to deterioration of the adhesive material when exposed to sun, water and chemical conditions inherent in a swimming pool environment.

In addition, prevention of air entrapment is one important key to proper filter bag performance. Submerged pool cleaner devices are designed with a predetermined buoyancy or buoyancy characteristic to ensure that they can climb pool wall surfaces and traverse floor surfaces of a swimming pool without lifting or significant tilting relative to the pool surface being cleaned. If a filter bag non-woven material is selected that is too thick, air can become entrapped within the filter bag resulting in increased buoyancy and reduced cleaner performance. Adhesive coated filter bag materials and some non-woven materials with excessive point-bonding area can also contribute to this air entrapment problem due to attenuated air flow or reduced available surface area.

U.S. Ser. No. 10/917,790 discloses an improved disposable filter bag for a pool cleaner, wherein the filter bag is constructed from a porous filter material such as a non-woven spunbond polymer having marginal seams formed by direct welding, in the absence of additional adhesive material. In a preferred configuration, such filter bag further includes an elongated divider seam for subdividing the hollow bag interior into a primary flow chamber for receiving flow of water and water-entrained debris from the pool cleaner, and a secondary collection chamber for trapping and collecting the water-entrained debris, generally as shown and described in U.S. Pat. No. 4,618,420. While such filter bag provides a significant improvement in the art, the elongated divider seam has been found to result in localized weakening of the bag material, thereby decreasing bag resistance to undesirable tearing. In addition, this divider seam has terminated abruptly at an upper end, to result in a stress concentration point that is also susceptible to undesirable tearing.

There exists, therefore, a need for further improvements in and to filter bags for pool cleaners, particularly with respect to an improved disposable filter bag designed for removable mounting onto the upper or downstream end of a pool cleaner suction mast, and for convenient and economical disposal together with particulate debris collected therein when the filter bag reached a substantially filled condition. More particularly, there exists a need for an improved disposable filter bag having a divider seam that is highly resistant to tearing. The present invention fulfills these needs and provides further related advantages.

SUMMARY OF THE INVENTION

In accordance with the invention, an improved disposable filter bag and related method of construction are provided, wherein the improved filter bag is designed for use with a pool cleaner of the type disclosed, for example, in U.S. Pat. Nos. 6,665,900; 5,863,425; 4,558,479; and 3,822,754, which are incorporated by reference herein. The filter bag is formed from a disposable porous filter material having marginal seams formed as by direct welding to form a reinforced cuff defining an open bag mouth leading to a hollow bag interior. The cuff is configured for removable mounting on a pool cleaner suction mast, as by removable connection to a mounting collar as disclosed in U.S. Pat. Nos. 5,863,425; D409,341; and D468,067, which are also incorporated by reference herein. The improved filter bag further includes a divider seam of increased strength, defined by a spaced-apart array of welds, for subdividing the bag interior into a primary flow chamber for receiving flow of water and water-entrained debris from the pool cleaner, and a secondary collection chamber for trapping and collecting the water-entrained debris.

In the preferred form, the filter bag is formed from a porous filter material adapted for interconnecting marginal edges thereof by direct welding to form marginal seams without requiring additional adhesive material or adhesive coatings on the bag material. A preferred bag-forming material comprises a non-woven sheet material of selected porosity, such as a spunbond polymer suitable for direct-weld interconnection of marginal edges thereof to define marginal seams, and to shape the bag material to define the hollow bag interior with the mouth opening downwardly for receiving a flow of water and water-entrained debris from a pool cleaner suction mast. The bag mouth may incorporate a reinforced cuff for removable connection with a mounting collar adapted for removable mounting onto the pool cleaner suction mast, such as a mounting collar of the type shown and described in U.S. Pat. Nos. 5,863,425; D409,341; D468,067; and 6,740,233, which are also incorporated by reference herein. The bag mouth may also include alignment means such as an alignment port for interengagement with a mating alignment means such as an alignment pin on the mounting collar, for rotationally orienting the filter bag relative to the mounting collar.

The divider seam subdivides the hollow bag interior into the primary flow chamber for receiving flow of water and water-entrained debris from the pool cleaner, and the secondary collection chamber for trapping and collecting the water-entrained debris, generally as shown and described in U.S. Pat. No. 4,618,420, which is incorporated by reference herein. In accordance with the invention, the divider seam comprises a spaced-apart array or pattern of individual seam or weld points, each of which may comprise a small closed loop weld of oval or circular shape or the like, and which collectively define the elongated divider seam. An upper end of this divider seam is defined by a spaced-apart succession of the individual weld seams or points which collectively define a curved, preferably circular pattern to minimize stress concentration at that location. This pattern of spaced-apart individual seams or weld points forms the divider seam with increased strength, and reduce likelihood of tearing.

Direct weld processes for forming the marginal seams and the divider seam of the filter bag may include heat seaming or radio frequency (RF) seaming. A preferred bag material comprises a non-woven spunbond polypropylene.

The disposable filter bag also may also incorporate a ported tab formed integrally therewith, generally at an upper end thereof. This ported tab defines a laterally open port for interconnection with a support member used for coupling the upper end of the filter bag to a pool cleaner supply hose or the like, thereby retaining the filter bag in a generally upright orientation on the pool cleaner and preventing the filter bag from draping downwardly over and about the pool cleaner where it could otherwise become entangled in the cleaner wheels and/or scrape against pool surfaces. One preferred support member comprises a hose clasp as shown and described in copending U.S. Ser. No. 10/917,892, which is incorporated by reference herein.

Other features and advantages of the invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
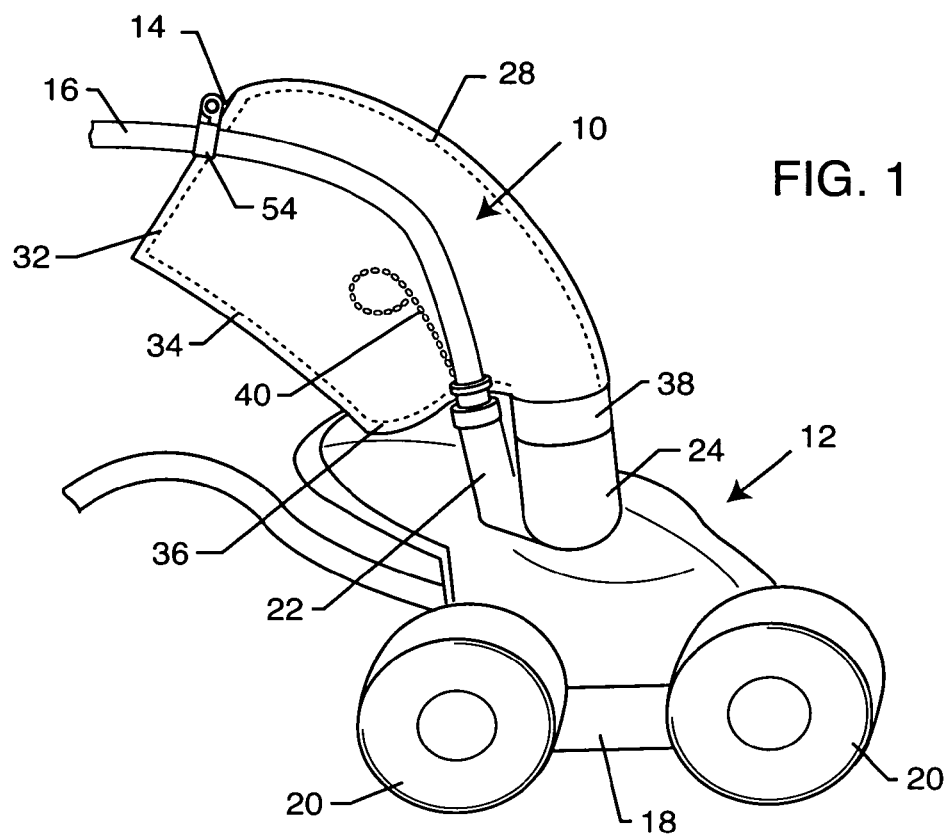
FIG. 1 is a perspective view of a pool cleaner having a disposable filter bag constructed in accordance with the novel features of the invention and shown mounted at an upper end of a pool cleaner suction mast.

As shown in the exemplary drawings, an improved and disposable filter bag referred to generally the reference numeral 10 is provided for use with a pool cleaner 12. The improved filter bag 10 incorporates a divider seam 40 (shown best in FIG. 2) of increased strength, defined by a spaced-apart array or pattern of individual seam or weld points 41, for subdividing the bag interior into a primary flow chamber 42 for receiving flow of water and water-entrained debris from the pool cleaner 12, and a secondary collection chamber 44 for trapping and collecting the water-entrained debris. The multiple spaced-apart pattern of weld points 41 provides a functional and effective divider seam 40 having increased strength, and increased resistance to tearing during normal bag handling and use.

The improved disposable filter bag 10 of the present invention is designed for use with a conventional automatic swimming pool cleaner of the type adapted for substantially random travel throughout the volume of a swimming pool or the like to pick up and collect particulate debris within the filter bag 10, and/or to assist in suspending or re-suspending such particulate matter so that it can filtered from the pool water by a main filtration system (not shown). FIG. 1 depicts an exemplary pool cleaner 12 generally in accordance with the pool cleaner shown and described in U.S. Pat. Nos. D469,589 and 6,665,900, which are incorporated by reference herein. More particularly, the illustrative pool cleaner 12 comprises a relatively compact housing 18 carried on a plurality of wheels 20. An internal drive means (not shown) is provided for causing the pool cleaner 12 to travel about within the pool, traversing submerged pool floor and wall surfaces, with said internal drive means being typically powered hydraulically by a water flow coupled to a cleaner supply mast 22 via a water supply hose 16 coupled to the main pool water filtration system (not shown). In one common form, the water flow is a positive pressure flow for hydraulically driving the internal drive means (not shown) and also for creating or inducing an upward suction or vacuum flow of water through a generally vertically oriented suction mast 24 on the pool cleaner 10 to vacuum particulate matter settled upon submerged pool surfaces. Alternative exemplary pool cleaners conforming generally hereto are shown and described in U.S. Pat. Nos. 5,863,425; 4,558,479; 4,589,986; and 3,822,754, which are also incorporated by reference herein.

In general terms, the disposable filter bag 10 is adapted for removable mounting onto a downstream or upper end of the suction mast 24, for receiving the upward column or flow of water and water-entrained debris discharged from the suction mast. In this regard, the filter bag 10 has a porous construction to permit upward flow-through passage of this water flow, with minimal or no significant flow obstruction, for return circulation of this water flow to the body of water within the swimming pool. However, the "effective mesh size" of the porous filter bag 10 is chosen to capture and retain the water-entrained particulate debris. This effective mesh size can be selected to optimize filtration of debris ranging from relatively small sand and silt to larger debris such as twigs and leaves. When desired, or when the filter bag 10 reaches a condition substantially filled with collected debris, the filter bag is removable from the pool cleaner suction mast 24 for disposal of the bag and the debris collected therein. A replacement filter bag 10 is then mounted onto the suction mast 24 for resumed pool cleaner operation.

Figure 2:
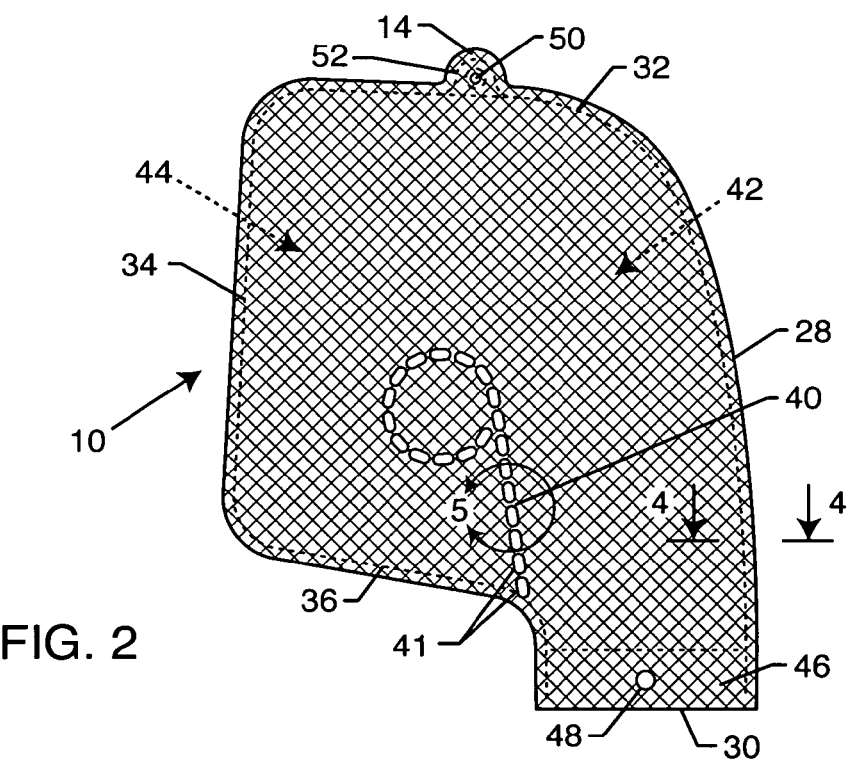
FIG. 2 is an enlarged side elevation view of the disposable filter bag.
Figure 3:
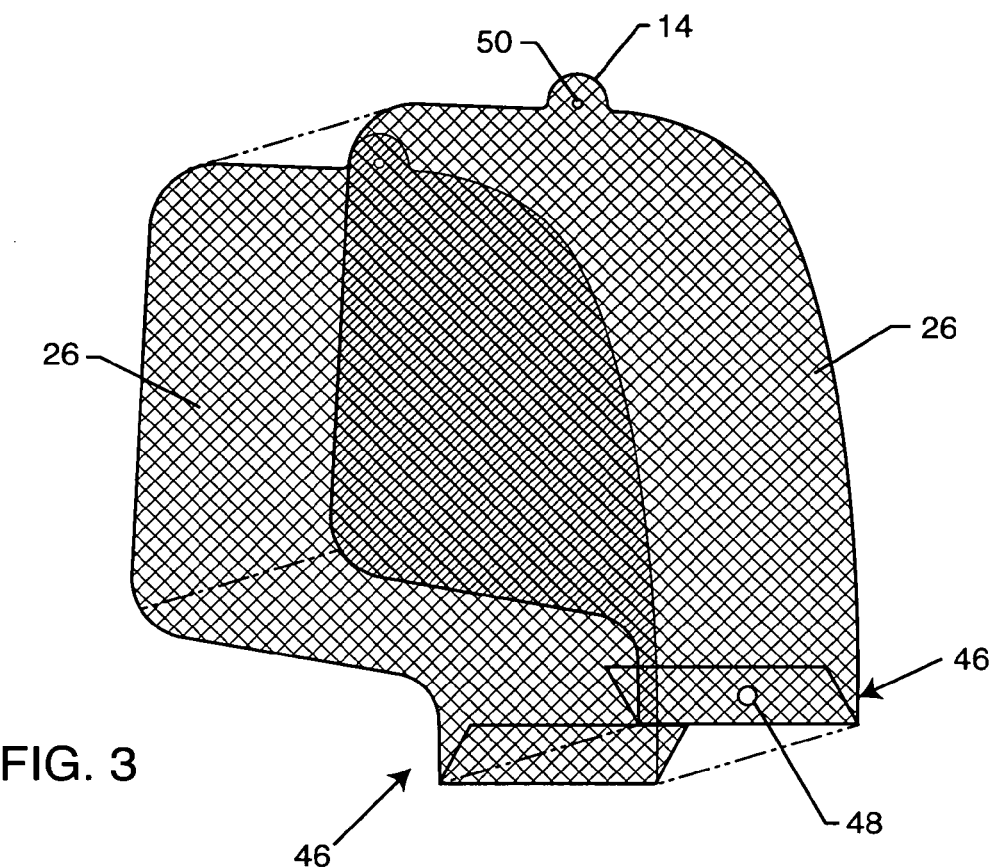
FIG. 3 is an exploded perspective view illustrating assembly of the disposable filter bag.

As shown best in FIGS. 2-3, and as further shown and described in a preferred form in U.S. Ser. No. 10/917,790, the filter bag 10 may be constructed from a pair of generally complementary-shaped sheets 26 (FIG. 3) of porous bag material of a type suitable for direct interconnection of marginal edges to define marginal seams, without requiring or using additional adhesive material such as a thermoplastic or heat-melt adhesive impregnated into or otherwise coated upon the bag material. Preferred porous bag materials include non-woven sheet material of selected porosity, such as a spunbond polymer suitable for direct-weld interconnection of marginal edges thereof as by heat or heat impulse seaming, or alternately by radio frequency (RF) or ultrasonic welding. One preferred bag material comprises a non-woven spunbond polypropylene. Alternative bag materials may include polyester-based materials and the like.

Figure 4:
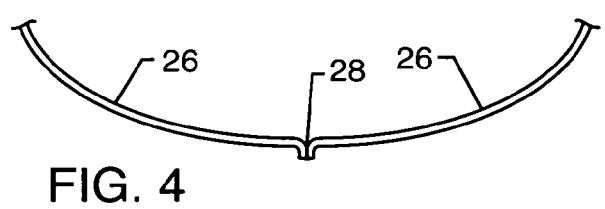
FIG. 4 is an enlarged fragmented sectional view taken generally on the line 4-4 of FIG. 2.

The sheets 26 of bag-forming material (FIG. 3) are interconnected along the margins thereof to define secure and stable, relatively low profile seams. In the illustrative embodiment as shown, the sheets 26 are direct-weld connected to define a front seam or margin 28 which extends generally upwardly from a downwardly open bag mouth 30 disposed at a front and lower end of the filter bag 10. An upper end of the front seam 28 merges through a rearwardly curved segment with a generally rearwardly extending upper seam 32, which in turn has a rearmost end merging with a downwardly extending rear seam 34. The lowermost end of this rear seam 34 merges with a forwardly extending lower seam 36 that terminates in spaced relation with a lower end of the front seam 28 and cooperates therewith to define the open bag mouth 30. Each of these seams 28, 32, 34 and 36 is beneficially formed by direct welding, as described above, to provide a low profile seam configuration having minimal overlapping interconnected sheet surfaces, and with little or no extraneous bag material protruding outwardly beyond the associated seam, as viewed in section in FIG. 4 relative to the front seam 28. In alternative filter bag configurations, a single sheet of bag material may be provided and appropriately folded upon itself to form one of the marginal edges of the bag, thereby providing one seamless margin as disclosed in U.S. Pat. No. 4,618,420, which is incorporated by reference herein.

Figure 7:
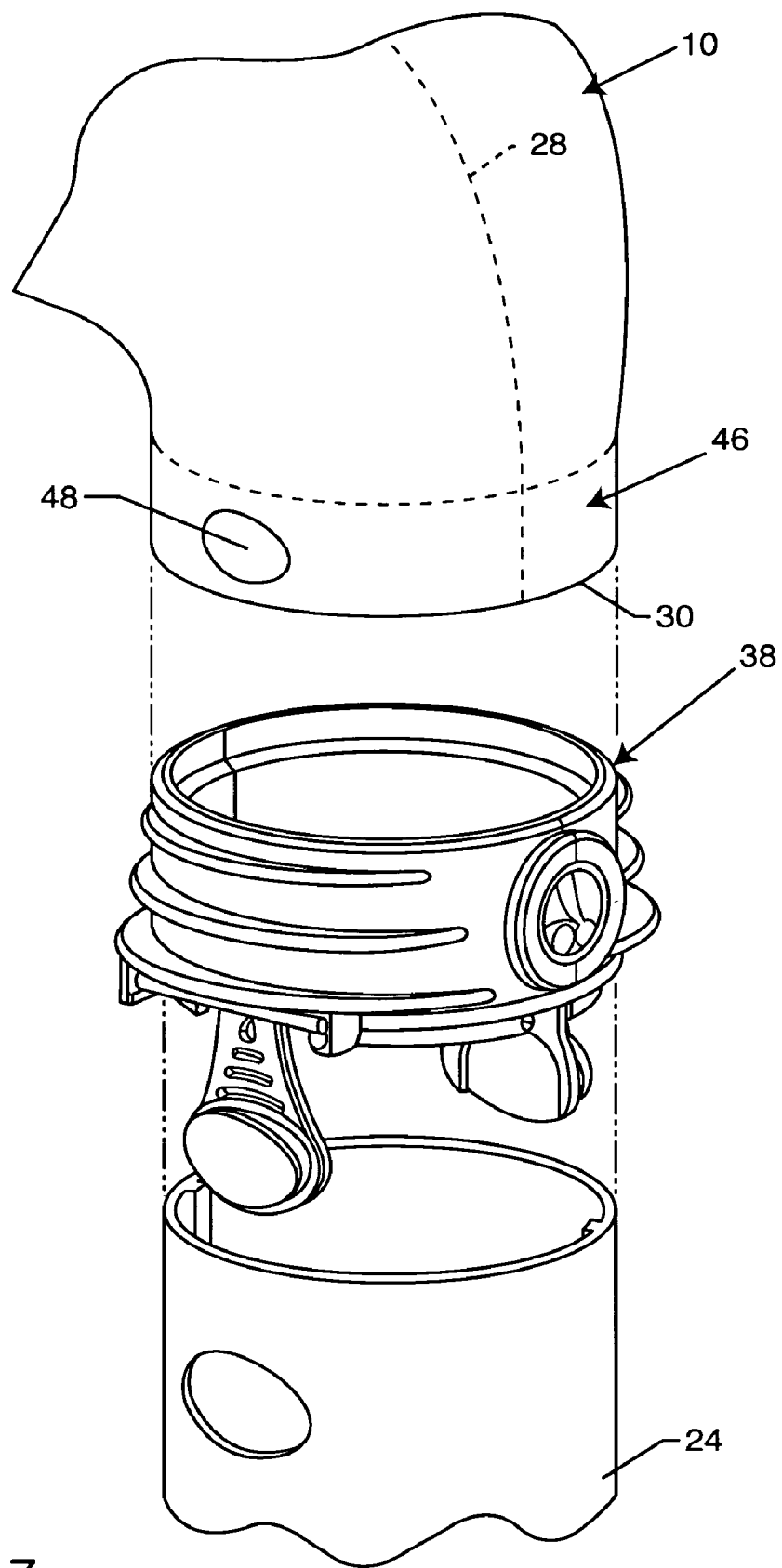
FIG. 7 is an exploded perspective view showing removable mounting of the disposable filter bag onto the pool cleaner.

The bag mouth 30 is adapted for removable mounting relative to the upper end of the pool cleaner suction mast 24, by suitable mounting means such as a mounting collar 38 (FIGS. 1 and 7) of generally cylindrical shape. This mounting collar 38 may comprise a clamp-type collar of the type depicted in FIG. 4, and as shown and described in U.S. Pat. Nos. D468,067 and 6,740,233, which are also incorporated by reference herein. Alternately, the mounting collar 38 may be constructed according to U.S. Pat. Nos. 4,563,425 and D409,341, which are also incorporated by reference herein, or in the form of a flexible or other collar configuration adapted for removable mounting onto the supply mast 24 with the bag mouth 30 positioned to receive the upward column of water and water-entrained debris during pool cleaner operation.

A reinforced cuff 46 may be formed by the assembled bag material to provide a zone of increased strength lining the bag mouth 30, for improved and secure coupling with the mounting collar 38. FIG. 3 shows the lower region of each sheet 26, at opposite sides of the mouth 30, folded inwardly and upwardly to from a region of double-layer or two-ply thickness. These two-ply regions are permanently formed upon direct-weld formation of the front and lower seams 32, 36 respectively as the front and rear margins of the open mouth 30. In addition, at least one of the sheets 26 may incorporate alignment means such as an alignment port 48 for registry with a matingly sized alignment pin (not shown) or the like formed on the mounting collar 38, thereby assuring assembly of the filter bag 10 with the mounting collar 38 in a correct, predetermined, rotationally front-facing orientation.

The disposable filter bag 10 may also incorporate a ported tab 14 formed integrally therewith, generally at an upper end thereof as an integral portion of the upper seam 32. This ported tab 14 protrudes upwardly from the top margin of the formed bag, with the upper seam 32 following the margin defined by the upwardly protruding tab 14. The tab 14 defines a laterally open port 50, with the inner diameter margin of this port 50 being lined by an additional direct-weld seam 52 (FIG. 2). The port 50 in the tab 14 is positioned and sized for interconnection with a suitable support member 54 (FIG. 1) used for coupling the upper end of the filter bag to the pool cleaner supply hose 16 or the like. The support member 54 on the supply hose 16 may comprise a variety of different tie and/or clamp structures, with a slidably mounted hose clasp of the type shown and described in copending U.S. Ser. No. 10/917,892, which is incorporated by reference herein, being preferred. The support member 54 retains the filter bag 10 in a generally upright orientation on the pool cleaner particularly when the pool cleaner is turned off or the upward water flow through the suction mast 24 is otherwise interrupted, such as during a back-up maneuver. Accordingly, the support member 54 engages with the integral tab 14 to prevent the filter bag 10 from draping downwardly over and about the pool cleaner 12 where the bag could otherwise become entangled in the cleaner wheels 20 and/or scrape against pool surfaces.

The hollow bag interior is subdivided by means of the centrally positioned, upstanding divider seam 40 (FIG. 2) which may also be formed by direct-weld connection of the laterally opposed sides of the filter bag defined by the opposing sheets 26, to subdivide the bag into the front or primary chamber 42 for receiving the upward-flowing column of water and debris from the suction mast 24 to enter the filter bag through the bag mouth 30, and the rearward or secondary debris collection chamber 44 within which the particulate debris tends to settle for collection. In this regard, the divider seam 40 extends upwardly from the lower seam 36, generally at a rear side or rear margin of the mouth 30, and terminates at a height spaced substantially below the upper seam 32.

During normal use of the filter bag 10 on a pool cleaner 12, the upwardly flowing column of water and water-entrained debris from the suction mast 24 enters the filter bag 10 via the open mouth 30. This column of water and water-entrained debris flows upwardly through the primary flow chamber 42 and then transitions over the upper end of the divider seam 40 into the rearward or secondary flow clamber 44 where the debris settles and is collected and retained within a lower region of that chamber 44, at a location generally at a rear side of the divider seam 40.

Figure 6:
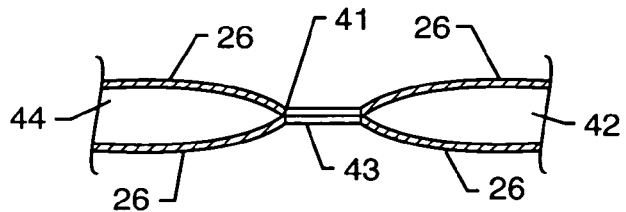
FIG. 6 is an enlarged fragmented sectional view taken generally on the line 6-6 of FIG. 5.
Figure 5:
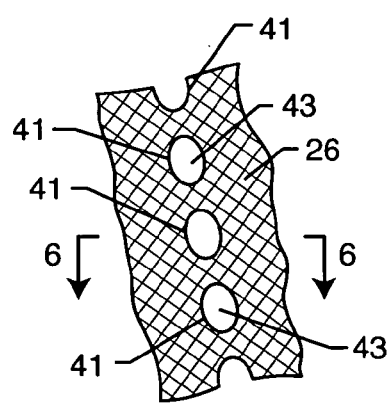
FIG. 5 is an enlarged, fragmented side elevation view of a portion of the filter bag, corresponding generally with the encircled region 5 of FIG. 2.

In accordance with a primary aspect of the improved filter bag 10 of the present invention, the divider seam 40 is defined by the spaced-apart array or pattern of individual seam or weld points 41, for subdividing the bag interior into the primary flow chamber 42 disposed over the bag mouth 30 for receiving the upward flow of water and water-entrained debris from the pool cleaner 12, and the secondary collection chamber 44 for trapping and collecting the water-entrained debris. The multiple spaced-apart pattern of weld points 41 provides a functional and effective divider seam 40 having increased strength, and increased resistance to tearing. FIGS. 5-6 illustrate these weld points 41 in one preferred form, each comprising a small closed loop weld of oval or circular shape or the like to define a port 43 opening laterally through the bag. Such weld points 41 defining the ports 43 are relatively closely spaced to each other, as by a spacing increment generally equal to or less that a longitudinal dimension of the ports 43, for collectively defining the elongated divider seam 40 while substantially preventing debris settled within the secondary collection chamber 44 from passing forwardly between these weld points 41 back to the primary flow chamber 42.

An upper end of this divider seam 40 is defined by a continuation of these spaced-apart individual weld seams or points 41 which turn rearwardly toward the secondary collection chamber 44 with a curved, preferably circular or near-circular pattern, as shown best in FIGS. 1 and 2. This curving shape for the upper end of the divider seam 40 advantageously minimizes or eliminates any abrupt end-termination of the seam 40, and thereby also minimizes or eliminates any stress concentration site at the upper end of the seam 40 to further enhance bag strength while reducing the likelihood of bag tearing during normal handling and usage.

A variety of further modifications and improvements in and to the improved filter bag 10 of the present invention will be apparent to those persons skilled in the art. Accordingly, no limitation on the invention is intended by way of the foregoing description and accompanying drawings, except as set forth in the appended claims.

What is claimed is:

1. A pool cleaner filter bag for use with a pool cleaner having a mast for flow of water and water-entrained debris from a swimming pool or the like, said pool cleaner filter bag comprising:

a porous bag material interconnected along marginal edges to define a hollow bag interior and an open mouth adapted for mounting relative to a discharge end of a pool cleaner mast, whereby a column of water and water-entrained debris discharged from the mast flows into said bag interior for debris capture therein; and a divider seam interconnecting laterally opposed sides of the filter bag for subdividing said bag interior into a primary chamber having a lower end in flow communication with said mouth, and a secondary debris collection chamber having an upper end in flow communication with an upper end of said primary chamber;

said divider seam being defined by a spaced-apart array of individual weld points.

2. The pool cleaner filter bag of claim 1 wherein each of said individual weld points comprises a closed loop weld.

3. The pool cleaner filter bag of claim 1 wherein an upper end of said divider seam is defined by a spaced-apart succession of said individual weld points collectively defining a curved pattern.

4. The pool cleaner filter bag of claim 3 wherein said curved pattern comprises a generally circular pattern.

5. The pool cleaner filter bag of claim 1 wherein each of said weld points defines a laterally open port formed in said porous bag material, and further wherein said weld points are spaced apart by a spacing increment generally equal to or less than a longitudinal dimension of said laterally open ports.

6. The pool cleaner filter bag of claim 1 wherein said porous bag material defines a front margin extending generally upwardly from said bag mouth, an upper margin extending generally rearwardly from an upper end of said front margin, a lower margin extending generally rearwardly from said bag mouth, and a rear margin interconnecting said upper and lower margins generally at rear ends thereof, said divider seam extending upwardly from said lower margin and terminating at a height spaced substantially below said upper margin.

7. The pool cleaner filter bag of claim 1 wherein at least some of said marginal edges and each of said weld points comprise a seamed margin formed by direct weld interconnection of said sheets in the absence of additional adhesive material.

8. The pool cleaner filter bag of claim 1 wherein said porous bag material comprises a non-woven sheet material.

9. The pool cleaner filter bag of claim 1 wherein said porous bag material comprises a spunbond polymer.

10. The pool cleaner filter bag of claim 1 further including a ported tab of closed loop shape formed integrally with at least one of said marginal edges, said ported tab being lined by a weld seam.

11. The pool cleaner filter bag of claim 1 further including means for mounting said mouth onto a discharge end of a pool cleaner mast.

12. A pool cleaner filter bag for use with a pool cleaner having a mast for flow of water and water-entrained debris from a swimming pool or the like, said pool cleaner filter bag comprising:
- a porous bag material interconnected along marginal edges to define a hollow bag interior bounded by an open mouth adapted for mounting relative to a discharge end of a pool cleaner mast, a front margin extending generally upwardly from said bag mouth, an upper margin extending generally rearwardly from an upper end of said front margin, a lower margin extending generally rearwardly from said bag mouth, and a rear margin interconnecting said upper and lower margins generally at rear ends thereof, whereby a column of water and water-entrained debris discharged from the mast flows through said bag mouth and into said bag interior for debris capture therein; and
- a divider seam interconnecting laterally opposed sides of the filter bag for subdividing said bag interior into a primary chamber having a lower end in flow communication with said mouth, and a secondary debris collection chamber having an upper end in flow communication with an upper end of said primary chamber, said divider seam extending upwardly from said lower margin and terminating at a height spaced substantially below said upper margin;
- said divider seam being defined by a spaced-apart array of individual weld points each comprising a closed loop weld.

13. The pool cleaner filter bag of claim 12 wherein an upper end of said divider seam is defined by a spaced-apart succession of said individual weld points collectively defining a curved pattern.

14. The pool cleaner filter bag of claim 12 wherein each of said weld points defines a laterally open port formed in said porous bag material, and further wherein said weld points are spaced apart by a spacing increment generally equal to or less that a longitudinal dimension of said laterally open ports.

15. The pool cleaner filter bag of claim 12 wherein said porous bag material comprises a non-woven sheet material, and further wherein at least some of said marginal edges and each of said weld points comprise a seamed margin formed by direct weld interconnection of said sheets in the absence of additional adhesive material.

16. A method of manufacturing a pool cleaner filter bag, comprising the steps of:
- interconnecting a porous bag material along marginal edges to define a hollow bag interior and an open mouth adapted for mounting relative to a discharge end of a pool cleaner mast, whereby a column of water and water-entrained debris discharged from the mast flows into said bag interior for debris capture therein; and
- forming a divider seam for subdividing said bag interior into a primary chamber having a lower end in flow communication with said mouth, and a secondary debris collection chamber having an upper end in flow communication with an upper end of said primary chamber, said divider seam forming step comprising forming a spaced-apart array of individual weld points interconnecting laterally opposed sides of the filter bag.

17. The method of claim 16 wherein said divider seam forming step comprises forming each of said weld points substantially in a closed loop configuration.

18. The method of claim 16 including the step of forming an upper end of the divider seam as a spaced-apart succession of individual weld points collectively defining a curved pattern.

19. The method of claim 16 wherein said divider seam forming step comprises forming each of the weld points to define a laterally open port formed in said porous bag material, and spacing the weld points by a spacing increment generally equal to or less that a longitudinal dimension of the laterally open ports.

20. The method of claim 16 further including the step of forming a ported tab of closed loop shape generally at one of the marginal edges, and lining the ported tab with a weld seam.

* * * * *